June 16, 1931.  A. W. READER  1,809,865

LUBRICATING APPARATUS

Filed Feb. 25, 1927

Inventor
A. W. Reader
By Williams, Bradbury,
McCaleb & Hinkle
Attys.

Patented June 16, 1931

1,809,865

UNITED STATES PATENT OFFICE

ALLAN WARREN READER, OF FERNDALE, MICHIGAN, ASSIGNOR TO ALEMITE CORPORATION, OF CHICAGO, ILLINOIS, A CORPORATION OF DELAWARE

LUBRICATING APPARATUS

Application filed February 25, 1927. Serial No. 170,799.

My invention relates to centralized systems of chassis lubrication, and has for its main object the provision of a simplified conduit arrangement for supplying lubricant to the king pin, tie rod bolts, and front wheel braking mechanism of an automobile.

A further object is to provide a novel type of swivel connection for lubricant supply conduits.

A further object is to provide a device of the above mentioned class which is simple in construction and may be economically manufactured.

Further objects will appear from the following description, reference being had to the accompanying drawings, in which.

Figure 1:
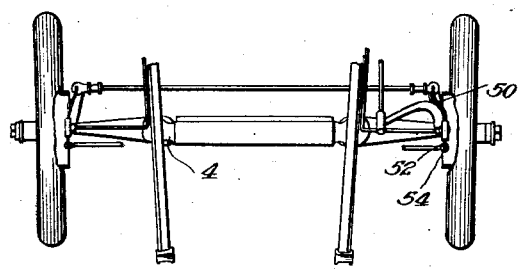
Fig. 1 is a plan view of the front end portion of an automobile chassis.
Figure 2:
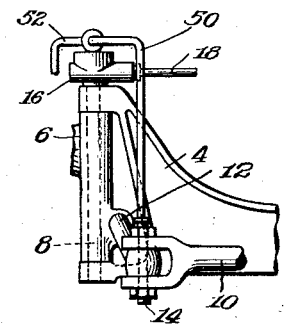
Fig. 2 is a detail elevation of a portion of the front axle and the steering knuckle assembly.

As shown in Figs. 1 and 2, the front axle 4 carries the spindle body 6 between its end yoke. A king bolt 8 extends through the yoke forming a pivot for the spindle. The tie rod 10 is pivotally connected to the spindle arm 12 by means of a bolt 14.

Figure 3:
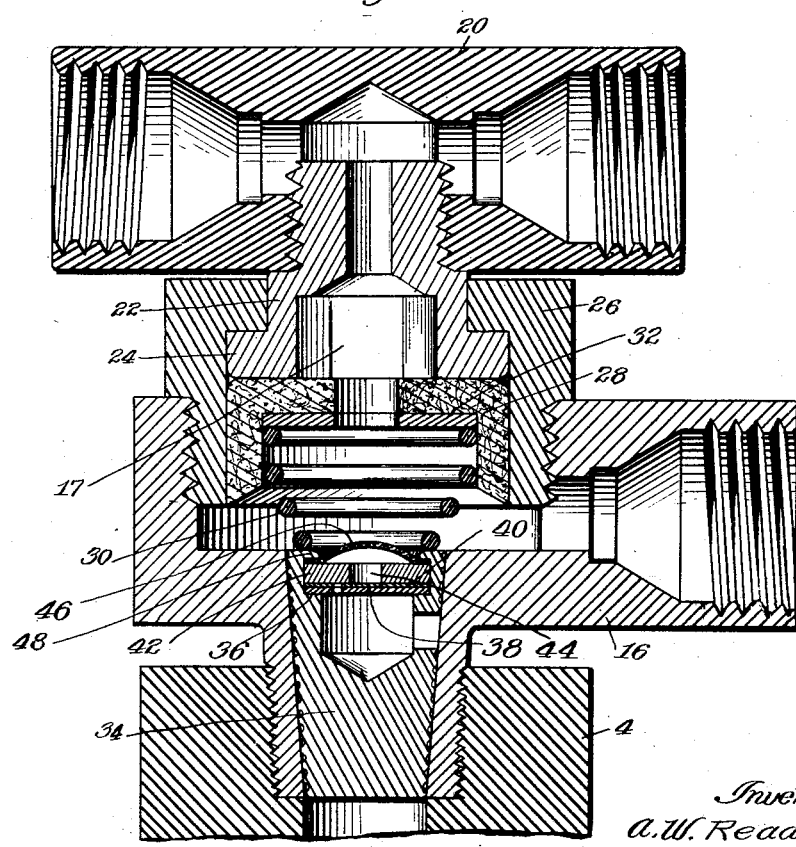
Fig. 3 is a vertical central sectional view of my improved swivel conduit connection.

In the form of my invention illustrated in the drawings, the body 16 of the swivel connection is preferably secured in the upper end of the front axle yoke, as shown in Fig. 3. The body is threaded at one end to receive the lubricant supply conduit 18. A swivel head 20 is threaded at its center to receive a tube 22. This tube has a flange 24 which is engaged by a collar 26, which in turn threads within the body 16. A hexagonal socket 17 is preferably provided at the lower end of the bore of the tube 22 to facilitate the screwing of this part into the head. An apertured flexible cup leather 28, reinforced by a perforated metallic disc 32, is held against the lower end of the tube 22 by a conical spring 30. The lower end of the spring 30 rests upon a tapered flow resistance plug 34 which fits snugly within the complementally tapered bore in the body 16. This plug is shouldered at 36 to provide a seat for a flexible flap valve 38, the opening movement of which is limited by a thin flat spring 40. A disc 42 provided with an orifice 44 to permit the passage of lubricant, and a wire mesh strainer 46 are positioned over the valve and are confined by a bead 48 which is crimped over the parts to clamp them securely in assembled relation.

A suitable conduit 50 is connected to one of the threaded ends of the swivel head and leads to the tie rod bolt 14. A second conduit 52 leads from the other end of the swivel head 20 to the bearing 54 of the front wheel brake mechanism. It will be understood that the bearing 54 and the tie rod bolt 14 turn with the front wheel assembly in steering the automobile, so that the conduits 50 and 52 will always remain in the same relative positions, the revolving movement of the bearings being taken up in the swivel connections between the tube 22 and the shouldered collar 26.

In operation the oil supplied under pressure through conduit 18 will pass upwardly through the orifice in the cup washer and through the tube 22 and outwardly through the swivel head to the conduits 50 and 52. The cup leather 28 forms a positive seal between the tube 22 and the collar 26, the spring pressure on the cup leather being augmented by the lubricant pressure to form a fluid tight seal. It will be understood that a flow resistance assembly similar to that used on the king bolt, will be used at the tie rod bolt and at the bearing 54 of the braking mechanism. Since it is necessary for the oil to travel along the circuitous spiral path formed by the threads in the outer plug 34, considerable resistance will be afforded at the bearings so that each may receive the proper quota of the lubricant. If desired, the flow resistance plugs 34 at the various bearings may have different resistances to compensate for the unequal quantity of lubricant desired at each bearing.

While I have shown and described a particular embodiment of my invention, it will be apparent to those skilled in the art that slight variations in the design and structure may be made without departure from the principles of my invention. I, therefore, do not wish the scope of my invention to be limited except as necessary by the claims which follow.

I claim:

1. In a lubricating conduit system for the bearings adjacent the steering knuckle of an automotive vehicle, the combination of a chambered body adapted to be secured to the king bolt bearing and having a lateral inlet, a head having a plurality of lateral outlets and a downwardly extending flanged projection said projection having a passageway communicating with said outlets, a collar fitting over the flange of said projection and threaded within said body, a cup leather engaging the end of said projection and the side walls of said collar, and means for resiliently pressing said cup leather against the end of said projection.

2. In a device of the class described, the combination of a plurality of bearings to be lubricated, two of said bearings being revolvable about a relatively stationary bearing, a conduit member for supplying lubricant under pressure to said relatively stationary bearing, a head having a swivel connection with said conduit coaxial with said relatively stationary bearing, lubricant-pressed means for sealing said connection, and rigid conduits connecting said head with said revolvable bearings.

3. In a branched conduit lubricant supply system for a plurality of bearings, a lubricant supply fitting adapted to be secured to a relatively stationary bearing to be lubricated, a head rotatably mounted on said fitting, a plurality of conduits connected to said head and leading to bearings revolvable relative to said fixed bearing, and a spring and lubricant pressed cup leather for forming a lubricant tight seal between said fitting and said head.

4. In a lubricating system, a plurality of bearings to be lubricated, one of said bearings being relatively stationary and the other bearings being revolvable about said stationary bearing, a fitting having a lateral inlet and a downwardly extending passageway leading to said stationary bearing, a flow resistance element in said passageway, a head having a plurality of laterally directed outlets and a downwardly extending flanged projection, conduits connecting said outlets with said revolvable bearings, a collar threaded in the top of said fitting and engaging said flange to connect said head and fitting for relative rotational movement, a cup leather in contact with the lower face of said projection and the internal side walls of said collar, and a spring resting on said element and pressing said cup leather against said projection.

5. In a lubricating conduit system for supplying lubricant to a relatively stationary bearing and a plurality of bearings revolvable about said stationary bearing, the combination of a chambered body secured to the stationary bearing and having a lateral inlet, a head having a plurality of outlets connected by conduits to said revolvable bearings, and a downwardly extending flanged projection, said projection having a passageway communicating with said outlets, an element having a portion engaging the flange of said projection, said element being threaded in said body, and sealing means engaging the end of said projection and the side walls of said element thereby to prevent escape of lubricant between said element and projection.

6. In a lubricating conduit system for supplying lubricant to a relatively stationary bearing and a plurality of bearings revolvable about said stationary bearing, the combination of a chambered body secured to the stationary bearing and having a lateral inlet, a head having a plurality of outlets connected by conduits to said revolvable bearings, and a downwardly extending flanged projection, said projection of such length as to permit slight vertical reciprocation, a passageway therein communicating with said outlets, an element having a portion engaging the flange of said projection, said element being threaded in said body, and sealing means engaging the end of said projection and the side walls of said element thereby to prevent escape of lubricant between said element and projection.

7. In a lubricating conduit system for the bearings adjacent the steering knuckle of an automotive vehicle, the combination of a chambered body adapted to be secured to the king bolt bearing and having a lateral inlet, a head having a plurality of lateral outlets and a downwardly extending flanged projection, said projection having a passageway communicating with said outlets, a collar fitting over the flange of said projection and threaded within said body, said projection adapted to be vertically reciprocated within said collar, a cup leather engaging the end of said projection and the side walls of said collar, and means for resiliently pressing said cup leather against the end of said projection.

In witness whereof, I hereunto subscribe my name this 16th day of February, 1927.

ALLAN WARREN READER.